Patented June 21, 1927.

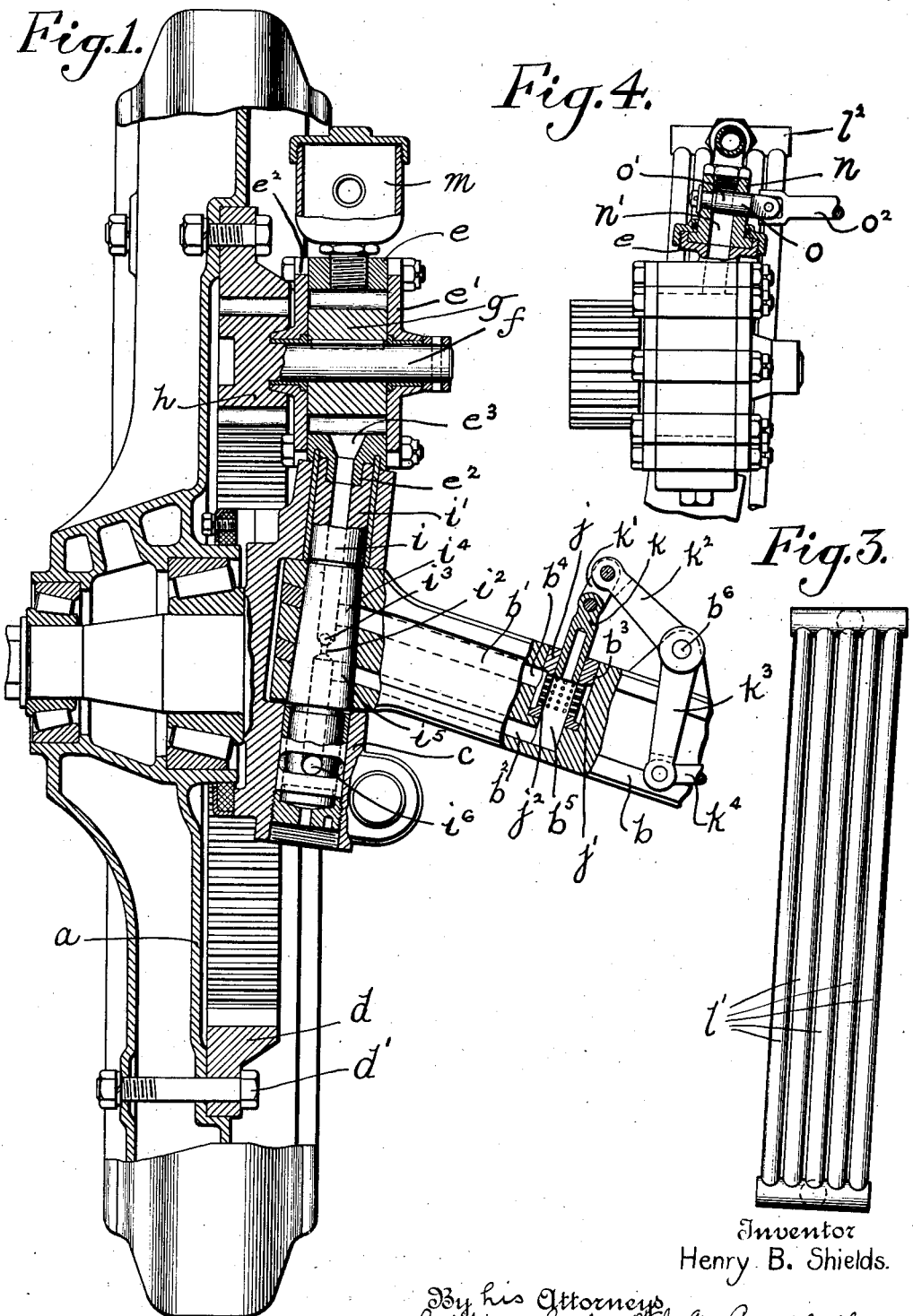

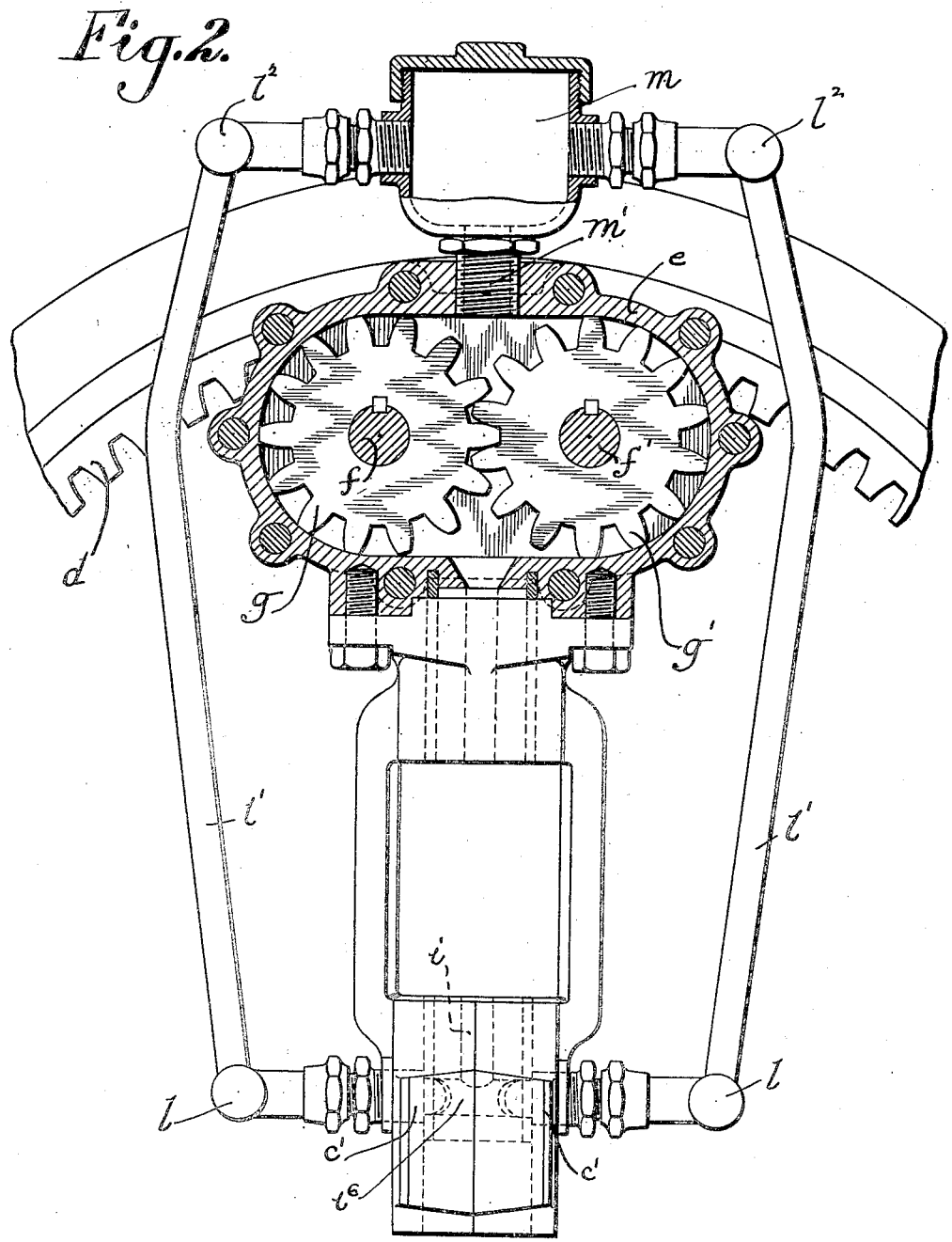

1,633,136

UNITED STATES PATENT OFFICE.

HENRY B. SHIELDS, OF FREEPORT, NEW YORK, ASSIGNOR TO INTERNATIONAL MOTOR COMPANY, OF NEW YORK, N. Y., A CORPORATION OF DELAWARE.

BRAKE.

Application filed November 28, 1924. Serial No. 752,501.

This invention relates to braking devices for vehicles. More particularly the invention relates to that type of brake mechanism in which the momentum of the vehicle is utilized to effect the braking action. In previous constructions the momentum of the vehicle has been used to initiate the operation of the brake actuating devices, which in time have effected the application of the braking action. It is an object of the present invention to utilize the momentum of the vehicle directly to decrease the speed thereof. Accordingly the rotation of a rotating element on the vehicle is made use of to actuate means which, when it is desired to brake the vehicle, may be subjected to reactive forces which have a retarding effect thereon and this reaction is transmitted to the rotating element to effect the desired braking action upon the momentum of the vehicle. In the illustrated embodiment a gear carried with the vehicle wheel actuates a pump which forces a suitable fluid through a continuous circuit. Upon obstructing the flow of fluid through the circuit the back pressure upon the pump serves to retard the operation thereof which retarding effect is in turn transmitted to the wheel. In order that the invention may be clearly understood and readily carried into effect the same will now be described more fully with reference to the accompanying drawings illustrating preferred embodiments thereof and in which:

Figure 1 is a view in front elevation, partly in section, of the front wheel of a motor vehicle to which the invention is applied.

Figure 2 is a sectional view taken through the pump and its associated mechanism and showing the manner of operation of the pump by the wheel.

Figure 3 is a view in side elevation of a portion of the fluid circuit showing the means for cooling the same.

Figure 4 is a view showing the modification of the flow controlling devices used in effecting the application of braking power.

While the drawings illustrate the application of the invention to a front wheel of a motor vehicle it will be understood that it is equally applicable to any rotating element of any kind of vehicle. In Figure 1 there is illustrated a wheel $a$ supporting the axle $b$ in usual manner through the steering knuckle $c$. An internal rack $d$ is carried inwardly of the wheel $a$ and is removably secured as by bolts $d'$. Above the steering knuckle there is mounted a housing $e$ having inner and outer closures $e'$, $e^2$, respectively, which closures are provided with bearings for shafts $f$, $f'$, respectively. Shafts $f$ and $f'$ have keyed thereto respectively intermeshing gears $g$, $g'$ forming a fluid pump and disposed within the housing $e$. One of the shafts, say $f$, also carries a pinion $h$ meshing with the rack $d$. In the lowermost part of the housing $e$ there is formed a downwardly projecting portion $e^2$ having therethrough a passage $e^3$ which registers with a bore $i$ in knuckle pin $i'$. The bore $i$ is constricted at a convenient point in its length as at $i^2$ and this constricted passage is controlled by a check valve such as ball $i^3$ for a purpose which will be made apparent hereafter. Immediately above and below the constricted portion $i^2$ outlets $i^4$, $i^5$ are formed in the knuckle pin. These outlets register respectively with channels $b'$, $b^2$ formed in the axle $b$. In actual practice these channels will be formed conveniently by boring from the end of the axle as will be apparent from an inspection of Figure 1. The axle is recessed at some distance from its end as at $b^3$, the end of the channel $b'$ opening into the recess $b^3$ as at $b^4$ and the channel $b^2$ entering the bottom of the recess as at $b^5$. Disposed within the recess is a sleeve $j$ formed with a circumferential channel or groove $j'$ which communicates with the entrance $b^4$ of passage $b'$ and permits a flow of fluid from the channel $b'$ entirely around the sleeve $j$. A plurality of openings $j^2$ are formed in the walls of the sleeve in the region of the cut-out portions $j'$ to afford communication between the circumferential channel and the interior of the sleeve. Thus fluid flowing through the passage $b'$ enters the circumferential channel $j'$ passes through the orifices $j^2$ and exits into the passage $b^2$ through the mouth. To control the flow of fluid from the passage $b'$ into the passage $b^2$ a valve element $k$ is adapted to slide within the interior of the sleeve $j$ and uncover or close as desired, one or more of the rows of openings $j^2$. Valve $k$ is connected at its upper end as by a link $k'$ with one arm $k^2$ of a bell crank lever pivoted upon the axle as at $b^6$, the other arm $k^3$ of the bell crank lever being suitably connected as by a rod $k^4$ to control devices conveniently placed within the reach of the vehicle operator. In the lower part of the steering knuckle there is formed a transverse passage $i^6$ communicating with the bottom of the passage $i$ and adapted to communicate with opposed passages $c'$ in the steering knuckle. The passages $c'$ are preferably elongated in transverse directions in order that they may always be in communication with the passage $i^6$ in the steering pin regardless of variations in position of the steering knuckle during steering of the vehicle. Communicating with the passages $c'$ upon opposite sides of the steering knuckle are headers $l$ from which a plurality of tubes $l'$ extend upwardly in suitable fashion to similar headers $l^2$ which communicate in turn with a reservoir $m$ disposed above the housing $e$ and communicating with the interior thereof by means of a passage $m'$.

In operation under normal circumstances, when the vehicle is moving and it is not desired to apply braking power to the wheel, the rotation of the wheel $a$ causes the rotation of the pinion $h$ by means of the rack $d$. Rotation of the pinion $h$ causes rotation of the gears $g$, $g'$ constituting the pump. The reservoir $m$, housing $e$, passages $i$, $b'$, $b^2$ and radiator $l'$ are filled with a suitable fluid such as oil. Operation of the pump during forward motion of the vehicle causes a constant circulation of fluid downwardly in the passage $i$ through the passage $b'$ and into the circumferential channel $j'$, from whence the fluid passes into the channel $b^2$ through the orifices $j^2$. The fluid is then led from the channel $b^2$ through the passages $i^6$ and $c'$ into the headers $l$ from whence it passes through the series of tubes $l'$ into the headers $l^2$ and from thence into the reservoir $m$ and back again into the housing $e$ through the passage $m'$. This circulation, of course, depends upon the withdrawal of the plunger $k$ to fully open position as indicated in Figure 1. Suppose, for instance, that the plunger $k$ is inserted part way within the interior of the sleeve $j$ by means of the actuating mechanism of which the bell crank $k'$ is an element. Such partial insertion of the stopper $k$ closes off one or more of the rows of orifices $j^2$ and provides a restricted passage for the fluid from the channel $b'$ to the channel $b^2$ and thus sets up a degree of back pressure against the pump retarding in a measure the rotation of the pump. This retardation likewise affects the gear $h$ causing it to rotate more slowly against the action of the rack $d$ and thereby in turn retarding the rotation of the rack. In this manner the rotation of the wheel is retarded resulting in a braking action. Inserting the plunger $k$ entirely within the sleeve $j$ will serve to cut off all circulation of the fluid thereby preventing almost entirely the rotation of the gear wheels and affording braking action to the wheel. It will be noticed in this connection, however, that the gear wheels $g$, $g'$ will be permitted some rotative movement in the fluid thereby preventing the locking of the wheel which, as is well known, is detrimental particularly in front wheels. By the provision of the check valve $i^3$ excess pressure beyond the valve $k$ may be relieved as will be apparent. Naturally during operation of the device the fluid will be somewhat heated. To afford a cooling action a radiator comprising the tubes $l'$ is provided upon opposite sides of the steering knuckle, the plurality of tubes affording ample radiation surface.

In some situations it may be deemed inadvantageous to drill the axle. The modification of the invention illustrated in Figure 4 may be adopted in lieu of associating the brake actuating mechanism with the axle. In this instance, the reservoir $m$ is replaced by a casting $n$ having a bore $n'$ therein, the axis of which coincides with the axis of the knuckle pin. The casting $n$ is rotatable about its axis with respect to the housing $e$ with which it communicates. At a suitable point in the housing there are formed bearings for a valve $o$, in the present instance, formed as a rod having a passage $o'$ therethrough and rotatable within the bearing as by means of the arm $o^2$, whereby fluid may flow from the headers $l^2$ through the passage $o'$ and bore $n'$ into the housing $e$ at the will of the operator. In this manner the circulation of fluid through the device is controlled by valve means without necessitating weakening of the axle.

It will thus be seen that brake mechanism for the wheel of a vehicle is provided wherein the force of application is derived from the momentum of the car in either direction while at the same time locking of the steering mechanism with its deleterious results is prevented.

Various modifications in the application of the principle involved in the foregoing disclosure will occur to those skilled in the art and are deemed to be within the ambit of the invention. For instance a braking device according to the present invention may be associated with the propeller shaft instead of or in conjunction with similar devices applied to the wheels.

What I claim is:

1. The combination with a wheel, of a fluid pump, means to actuate the pump from the wheel, a continuous circuit for the fluid including cooling means therefor, and means to control the flow of fluid in the circuit.

2. The combination with a wheel of a fluid pump, means to actuate the pump from the wheel, a continuous circuit for the fluid, means to control the flow of fluid including cooling means therefor in the circuit, and means to partially relieve pressure in the circuit.

3. The combination with a vehicle wheel and axle, of a fluid pump of the rotary type carried with the axle, a gear to actuate the pump, a gear carried with the wheel and meshing with the first named gear, a conduit to conduct fluid from one side of the pump to the other and including a plurality of separate spaced passages, and a valve to control the flow of fluid in the conduit.

4. The combination with a vehicle wheel and axle, of a fluid pump of the rotary gear type carried with the axle, a gear to actuate the pump, a gear carried with the wheel and meshing with the first named gear, a conduit to conduct fluid from one side of the pump to the other and including a plurality of separate spaced passages, a valve to control the flow of fluid in the conduit, and remote actuating means for the valve.

5. The combination with a vehicle wheel and axle, of a fluid pump of the rotary gear type carried with the axle, a gear to actuate the pump, a gear carried with the wheel and meshing with the first named gear, a conduit to conduct fluid from one side of the pump to the other and including a plurality of separate spacer passages, a valve to control the flow of liquid in the conduit, a by-pass around the valve and a check valve in the by-pass.

6. In a motor vehicle, the combination with the steering wheel, axle, steering knuckle and knuckle pin, of a fluid pump of the rotary gear type, a housing for the pump carried with the knuckle above the pin, a continuous circuit for the fluid including an axial bore in the knuckle pin, a passage formed in the steering knuckle communicating with the bore in the pin and a radiator disposed between the passage and the pump housing and actuating gear for the pump, an annular rack carried with the wheel and meshing with the gear, and a valve to control the flow of fluid in the circuit.

This specification signed this 25 day of Nov., A. D. 1924.

HENRY B. SHIELDS.